United States Patent Office

3,268,290
Patented August 23, 1966

3,268,290
RECOVERY OF LITHIUM CHLORIDE FROM MIXTURES OF OTHER SALTS AND METALS
Remigius A. Gaska and Robert D. Goodenough, Midland, and Lance D. Simpson, Bay City, Mich., assignors to The Dow Chemical Company, Midland, Mich., a corporation of Delaware
No Drawing. Filed Nov. 4, 1963, Ser. No. 321,320
6 Claims. (Cl. 23—89)

This invention relates to a method for the recovery of lithium chloride from mixtures of magnesium metal, lithium chloride and other salts and, more particularly, is concerned with the recovery of lithium chloride from said mixtures by the addition of a short chain alcohol to the mixture and the subsequent separation of the lithium chloride from the alcohol.

The method of this invention finds particular utility in recovery of lithium chloride from sludge, i.e., soft mud, which is produced in the electrolytic production of magnesium metal. The sludge ordinarily is comprised of various quantities of magnesium metal, magnesium oxide, sodium chloride, potassium chloride, magnesium chloride, calcium chloride and at least 50 percent lithium chloride. Recovery of lithium chloride from this sludge is commercially important since this material, which is used as a supporting electrolyte in certain magnesium cells, can be returned to the electrolytic cell, if desired, for economic processing in magnesium metal production.

Thus, it is an object of the present invention to provide a new and effective way of recovering lithium chloride from mixtures of magnesium metal, lithium chloride and other salts and materials.

An additional object is to provide a new method for recovering lithium chloride and magnesium chloride from cell sludge produced in the electrolytic production of magnesium metal.

It is also an object of the present invention to provide lithium chloride and magnesium chloride which is low in calcium chloride, sodium chloride and potassium chloride content for use in electrolytic production of magnesium metal.

Other uses, objects and advantages of this invention will become apparent from the following detailed description thereof.

In accordance with the present invention, a short chain aliphatic monohydric alcohol having from 1 to about 4 carbon atoms is added to a magnesium cell sludge, as described hereinbefore, or other mixtures of magnesium metal, magnesium oxide, alkaline earth salts and alkali metal halides (including lithium chloride).

The resulting mixture is then agitated and maintained at a temperature within the range of from about 30° to about 70° C., preferably, from about 40° to about 50° C., whereby substantially all potassium chloride and magnesium oxide precipitate and are readily removed from the residual solution.

The residual solution is then heated to temperatures ranging from about 150° to about 615° C. so as to drive off the remaining alcohol and a salt mixture consisting primarily of substantially anhydrous lithium chloride is recovered.

Sludges produced in the electrolytic production of magnesium metal usually contain more than 1 percent calcium chloride and it may be desirable also to eliminate this calcium chloride from the sludge. Because of the high solubility of calcium chloride in short chain alcohols, the sludge may be pretreated by reacting it with at least a stoichiometric quantity of a soluble salt (e.g., alkali metal carbonate and sulfate such as potassium carbonate, sodium carbonate and potassium sulfate) which will convert the calcium chloride to the corresponding calcium salt of lower solubility in the short chain alcohol. If potassium carbonate is used for this purpose, both products, viz., calcium carbonate and potassium chloride, are relatively insoluble in short chain alcohols.

Magnesium metal powder, which may be present in the sludge, may be separated from the sludge, e.g., by screening with a 30 to 60 mesh screen, if desired. This step may be carried out before or after the addition of the alcohol to the sludge. Ordinarily some magnesium metal remains in the sludge even though an effort is made to remove it entirely by screening. Thus, when methanol is added to a wet or dry sludge or ethanol is added to a sludge containing some moisture, magnesium dimethoxide or magnesium diethoxide, respectively, is formed due to the reaction of said alcohol with the magnesium metal. Each of the magnesium alkoxides may be decomposed by adding hydrogen chloride gas or liquid to the slurry, thereby converting the alkoxides into useful magnesium chloride and recoverable methanol or ethanol, as the case may be.

The addition of hydrogen chloride gas or liquid to the combination of short chain alcohol and sludge mixture, previously mentioned, further converts any lithium carbonate formed during the calcium chloride conversion back to lithium chloride.

If desired, sodium chloride may be removed from the sludge thereby providing for a substantially sodium chloride-free final product. This may be carried out by first heating the slurry to a temperature within the range of from about 70° to about 150° C., thereby evaporating alcohol until about a 25 to 35 percent lithium chloride solution remains. The solution ordinarily is then maintained at a temperature within the range of from 40° to 150° C. to supersaturate the dissolved sodium chloride. A few crystals of sodium chloride may then be added to nucleate the formation of solid sodium chloride. The sodium chloride crystals so formed are readily separated from solution.

Any, all or various combinations of the hereinbefore-listed alternative process steps can be used in combination with the base alcohol treatment to provide a lithium chloride-magnesium chloride mixture of a predetermined impurity level from electrolytic cell sludge.

The mixture of magnesium metal and other salts or sludge to be suitable for use in the method of the instant invention should have a particle size within the range of from about 10 to about 50 mesh.

In general, the amount of the alcohol added to the magnesium metal, magnesium oxide and salt sludge is determined by the amount of lithium chloride present in the sludge. Thus, methanol may be added to the sludge so as to maintain a weight ratio of methanol to lithium chloride of at least 5.77.

Reaction of the sludge with the short chain alcohol is complete in from ½ to about 4 hours, and depends to a large degree on the intensity of stirring and vessel geometry.

Short chain alcohols which contain from 2 to 4 carbons may be used in addition to methanol and include, but are not limited to, ethanol, propyl alcohol, isopropyl alcohol and n-butanol.

In order to precipitate all the potassium chloride in said sludge on addition of a short chain alcohol thereto, the resulting alcohol phase must contain at least about 3.7 percent by weight lithium chloride and preferably about 7 percent by weight in the absence of other salts, i.e., magnesium chloride, calcium chloride. For the following alcohols, including ethanol, propyl alcohol, isopropyl alcohol and n-butanol, the resulting alcohol phase should contain at least about 2 percent, 1 percent, 1 percent and ½ percent lithium chloride, respectively, in order to precipitate all the potassium chloride from the sludge.

Hydrogen chloride, gaseous or liquid, should be added in at least stoichiometric quantities necessary to convert any magnesium dimethoxide or magnesium diethoxide formed from the reaction of magnesium metal (not separated out previously) and the alcohol to magnesium chloride and the corresponding alcohol as well as convert lithium carbonate from the carbonate pretreatment into lithium chloride. The pH of the mixture after the addition of the hydrogen chloride should be from about 1 to about 5.5.

Gaseous hydrogen chloride should be used in order to maintain the solvent in an anyhdrous state during the process so as to facilitate the recovery of pure alcohol and anhydrous products (viz., lithium chloride and magnesium chloride).

The reaction product, magnesium dimethoxide, is partially soluble in methanol and can be filtered to a high degree by an efficient filter. However, since it is desirable to have all soluble compounds and alcohol reaction products converted into magnesium chloride, it is advantageous to allow said products to pass through the filter while retaining the unreacted metal.

The following example is illustrative of the present invention and in no way is intended to be limited thereto.

*Example.*—50 grams of sludge from a magnesium electrolytic cell which had an approximate composition of:

About 55.0 percent LiCl
About 5.4 percent Mg metal
About 37.6 percent MgO
About 5.1 percent $MgCl_2$
About 1.3 percent $CaCl_2$
About 3.4 percent NaCl
About 0.2 percent KCl
About 0.5 percent acid insolubles was added to a formulation comprised of 250 milliliters of a 0.1 M solution of potassium carbonate in methanol. (The total of more than 100 percent shown for the sludge constituents is attributed to the precision of the analytical procedures employed.)

The above mixture was agitated for ½ hour to form a slurry. Said slurry was then passed through a 30 mesh screen in order to separate out the magnesium metal which had not reacted with methanol to form the soluble magnesium dimethoxide. About one gram of magnesium metal was recovered in this manner. The slurry (alcohol solution) was then filtered and the residue washed with 25 milliliters of methanol thereby separating magnesium oxide, potassium chloride therefrom. The alcohol solution was heated to about 150° C. until all the methanol had been removed. The dried product was found to weigh 26 grams and was found upon analysis to have the following composition:

96.6 percent LiCl
0.53 percent KCl
2.9 percent NaCl
0.06 percent $CaCl_2$
1.2 percent $MgCl_2$
0.56 percent $Li_2CO_3$ The residues of the process weighed 47.5 grams and contained 2.5 percent lithium chloride. Thus, the lithium chloride recovered contained 95.5 percent of the lithium chloride originally present in the sludge.

If a lower sodium chloride content in the final product is required, the sodium chloride in the alcohol slurry may be removed by first heating the slurry to a temperature within the range of from about 70° to about 150° C., thereby evaporating methanol until about 25 to 35 percent lithium chloride solution remains. The solution is then cooled to about 40° C. to supersaturate the dissolved sodium chloride. A few crystals of sodium chloride are than added to nucleate the formation of sodium chloride. The sodium chloride crystals so formed are then filtered from the solution.

Also, the magnesium dimethoxide formed by the reaction of magnesium metal and methanol can be removed by adding gaseous hydrogen chloride in at least stoichiometric quantities, thereby converting any magnesium dimethoxide present to magnesium chloride and methanol.

Various modifications may be made in the present invention without departing from the spirit or scope thereof for it is to be understood that we limit ourselves only as defined in the appended claims.

What is claimed is:

1. A method for recovering lithium chloride present as the principal member in admixture with magnesium metal, magnesium oxide, alkaline earth metal salts and alkali metal salts which comprises:
   (a) adding methanol in an amount to provide a methanol/lithium chloride weight proportion of at least 5.77, to the mixture to provide a slurry;
   (b) mixing and maintaining said slurry at a temperature within the range of from about 30° to about 70° C. so as to precipitate magnesium oxide and potassium chloride therefrom;
   (c) separating the precipitated magnesium oxide and potassium chloride from the alcohol solution;
   (d) adding hydrogen chloride to said alcohol solution thus lowering the pH of said solution to a value of from about 1 to about 5.5 thereby converting all magnesium metal and magnesium dimethoxide, which is formed by reaction of magnesium with methanol, to magnesium chloride and methanol; and
   (e) heating the solution to a temperature within the range of from about 150° to about 615° C. to drive off the remaining alcohol and produce a dry residue consisting primarily of lithium chloride.

2. The method in accordance with claim 1 wherein calcium chloride is eliminated from said solution including the step of adding a salt selected from the group consisting of alkali metal carbonates and alkali metal sulfates to said alcohol solution prior to separation of magnesium oxide and potassium chloride.

3. The method in accordance with claim 1 wherein the sodium chloride is eliminated from said alcohol solution including the steps of heating said alcohol solution to temperatures ranging from about 70° to about 150° C. to evaporate alcohol therefrom thereby concentrating said solution with respect to lithium chloride within the range of from 25 to 35 percent lithium chloride, maintaining said solution at a temperature within the range of from about 40° to about 150° C. while adding sodium chloride nucleating crystals to said solution thereby promoting the formation of sodium chloride crystals and separating said sodium chloride crystals from said solution.

4. A method for recovering lithium chloride and magnesium chloride from mixtures comprised of magnesium metal, lithium chloride, magnesium oxide and other salts including potassium chloride, magnesium chloride, sodium chloride and calcium chloride, which comprises:
   (a) adding a solution of potassium carbonate in methanol to said salt mixture to provide a methanol/lithium chloride weight ratio of at least 5.77;
   (b) mixing said mixture of salts and alcohol to form a slurry;
   (c) separating unreacted magnesium metal from said slurry;
   (d) maintaining said slurry at a temperature within the range of from about 30° to about 70° C. so as to precipitate magnesium oxide and potassium chloride therefrom leaving the remaining constituents of said mixture in solution in said alcohol;
   (e) separating the precipitate of magnesium oxide and potassium chloride from the alcohol solution;
   (f) adding hydrogen chloride to said alcohol solution thus lowering the pH of said solution a value of from about 1 to about 5.5 thereby converting substantially all remaining magnesium metal and magnesium dimethoxide, which is formed by reaction of magnesium with methanol, to magnesium chloride and methanol;

(g) heating said solution to temperatures ranging from about 70° to about 150° C. removing alcohol therefrom and concentrating said solution with respect to lithium chloride within the range of from about 25 to 35 percent lithium chloride;

(h) maintaining said solution at a temperature within the range of from about 40° to about 150° C. while adding sodium chloride nucleating crystals to said solution thereby promoting the formation of sodium chloride crystals therefrom;

(i) separating said sodium chloride crystals from said solution; and (j) heating said solution at temperatures within the range of from about 150° to about 615° C. so as to remove all of said methanol thereby producing substantially anhydrous lithium chloride and magnesium chloride as the product.

5. The method as defined in claim 4 and including the step of employing a sludge from an electrolyte magnesium cell as lithium chloride source.

6. A method for recovering lithium chloride present as the principal member in admixture with magnesium metal, magnesium oxide and alkaline earth metal salts and alkali metal salts, which comprises:

(a) adding a short chain aliphatic monohydric alcohol having from 1 to 4 carbon atoms and selected from the group consisting of methanol and ethanol to the mixture to provide a slurry;

(b) mixing and maintaining said slurry at a temperature within the range of from about 30° to about 70° C. thereby precipitating magnesium oxide and potassium chloride therefrom and separating said precipitate from the alcohol solution;

(c) adding hydrogen chloride to said alcohol solution thus lowering the pH of said solution to a value of from about 1 to about 5.5 thereby converting all magnesium metal and the corresponding magnesium alkoxide, which is formed by reaction of said alcohols with magnesium, to magnesium chloride and the corresponding alcohol; and (d) heating the alcohol solution to drive off the remaining alcohol and produce a dry residue consisting primarily of lithium chloride.

References Cited by the Examiner

UNITED STATES PATENTS

| 2,521,459 | 9/1950 | Hunter et al. | 23—89 |
| 2,533,246 | 12/1950 | Hayes et al. | 23—89 |
| 2,561,439 | 7/1951 | Erasmus | 23—89 XR |
| 3,114,602 | 12/1963 | Wood | 23—89 |

FOREIGN PATENTS 1,159,415  9/1959  Germany.

OSCAR R. VERTIZ, *Primary Examiner.*

MAURICE A. BRINDISI, *Examiner.*

E. STERN, *Assistant Examiner.*